US006751744B1

(12) United States Patent
Allen et al.

(10) Patent No.: US 6,751,744 B1
(45) Date of Patent: Jun. 15, 2004

(54) METHOD OF INTEGRATED CIRCUIT DESIGN CHECKING USING PROGRESSIVE INDIVIDUAL NETWORK ANALYSIS

(75) Inventors: Robert J. Allen, Jericho, VT (US); John M. Cohn, Richmond, VT (US); David J. Hathaway, Underhill Center, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/475,799

(22) Filed: Dec. 30, 1999

(51) Int. Cl.[7] .............................. G06F 1/12; G06F 17/50
(52) U.S. Cl. ............................. 713/401; 716/5; 716/6; 716/10
(58) Field of Search .......................... 713/40.1; 716/2, 716/6, 4, 1, 5, 10; 714/745; 703/17

(56) References Cited

U.S. PATENT DOCUMENTS

| | | | | |
|---|---|---|---|---|
| 4,335,457 A | * | 6/1982 | Early ........................ | 714/745 |
| 5,251,147 A | * | 10/1993 | Finnerty ..................... | 716/6 |
| 5,274,568 A | * | 12/1993 | Blinne et al. ................ | 716/6 |
| 5,406,497 A | * | 4/1995 | Altheimer et al. ............ | 716/6 |
| 5,636,372 A | | 6/1997 | Hathaway et al. | |
| 5,663,889 A | * | 9/1997 | Wakita ....................... | 716/6 |
| 5,703,788 A | * | 12/1997 | Shei et al. .................. | 364/488 |
| 5,724,557 A | * | 3/1998 | McBean, Sr. ................. | 716/6 |
| 5,751,593 A | * | 5/1998 | Pullela et al. ............... | 716/6 |
| 5,819,072 A | * | 10/1998 | Bushard et al. .............. | 716/6 |
| 5,844,818 A | * | 12/1998 | Kochpatcharin et al. .... | 364/578 |
| 5,883,818 A | * | 3/1999 | Salimi et al. ................ | 716/2 |
| 5,918,037 A | * | 6/1999 | Tremblay et al. ....... | 395/500.03 |
| 5,999,717 A | * | 12/1999 | Kaufmann et al. .... | 395/500.23 |
| 6,090,152 A | * | 7/2000 | Hayes et al. ................. | 716/6 |
| 6,163,875 A | * | 12/2000 | Suzuki ....................... | 716/4 |
| 6,182,020 B1 | * | 1/2001 | Fairbanks ................... | 702/117 |
| 6,192,505 B1 | * | 2/2001 | Beer et al. .................. | 716/2 |
| 6,324,496 B1 | * | 11/2001 | Alur et al. .................. | 703/17 |

OTHER PUBLICATIONS

IBM Technical Disclosure Bulletin, vol. 33, No. 10B, Mar. 1991 pp. 383 and 384.
IBM Technical Disclosure Bulletin, vol. 37, No. 9, Sep. 1994 pp. 433 and 434.
Ravi, N. et al. "Generation of Performance Constraints for Layout" IEEE Transactions on Computer–Aided Design, vol. 8, No. 8, Aug. 1989 pp. 860–874.

* cited by examiner

Primary Examiner—Jeffrey Gaffin
Assistant Examiner—Chun Cao
(74) Attorney, Agent, or Firm—Richard M. Kotulak (57) ABSTRACT

A method for checking integrated circuit designs comprising the steps of calculating a first performance parameter by analyzing the network's sensitivity to a signal applied to the network; comparing the first performance parameter to one or more rules to determine a first pass condition and writing the value of first performance parameter to a netlist file in response to a pass to the first pass condition; followed by calculating a second performance parameter based on a first network model to determine a second pass condition in response to a fail to said first pass condition and writing the second performance parameter to the netlist file in response to a pass to said second pass condition or writing an error flag to the netlist file in response to a fail to said second pass condition is disclosed. The method, at each step, decides if a quick to calculate parameter provides sufficient design margin or if a more accurate but longer to calculate parameter is required.

29 Claims, 6 Drawing Sheets

FIG. 1

PRIOR ART

FIG. 2

PRIOR ART

METHOD OF INTEGRATED CIRCUIT DESIGN CHECKING USING PROGRESSIVE INDIVIDUAL NETWORK ANALYSIS

FIELD OF THE INVENTION

The present invention relates to the field of integrated circuit design checking; and more specifically, it relates to an efficient method for analyzing the timing, noise, and power consumption of logic networks in such integrated circuits prior to physically implementing the circuitry in hardware.

BACKGROUND OF THE INVENTION

Integrated circuit devices are comprised of large numbers of networks linked together to perform various logic functions. They are typically implemented in hardware form on silicon dies using solid state integrated circuit technology of which many types exist, very large scale integration (VLSI) being an example. A hierarchical implementation in such technology exists. The basic elements are the transistor, resistor, capacitor, or inductor, usually built in the silicon. One or more of these basic elements, or combinations thereof are electrically coupled to form the next higher elements, logic elements or gates, that perform simple to moderate logic tasks. When these elements are implemented in silicon, unwanted but often unavoidable parasitic elements such as capacitors, resistors, and inductors are created which can change the designed performance of higher order elements in the design. Other non-electrical elements such as mechanical linkages and thermal resistances may also be created and may have an effect on other aspects of the design, such as its reliability. In the next higher element, one or more gates are then electrically coupled to form logic networks that perform more complicated logical tasks. The electrical interconnection is implemented in hardware in conductive lines in wiring layers on the integrated circuit. The signals run from gate to gate in a network along these conductive wiring layers. Several problems arise in these interconnection designs that can adversely effect network or integrated circuit performance.

First the implementation of these wires introduces additional parasitic elements which can add unexpected delays to the signal propagation through the network. Second, signals running in one wire in close proximity to a second can couple and create a false signal on the second wire. Third, local voltage levels in the power grid can drop in some networks, making them more sensitive to noise on the signal wire. And fourth networks, circuit gates or even individual transistors and resistors can draw more current than anticipated because of duty cycle or other reasons, increasing power consumption. This increased power consumption often leads to local voltage drops which increase noise sensitivity.

Because it is expensive and time consuming to complete a physical implementation of integrated circuit design, find problems, redesign, and rebuild, it is advantages to do design analysis and design correction before implementation.

Figure 1:
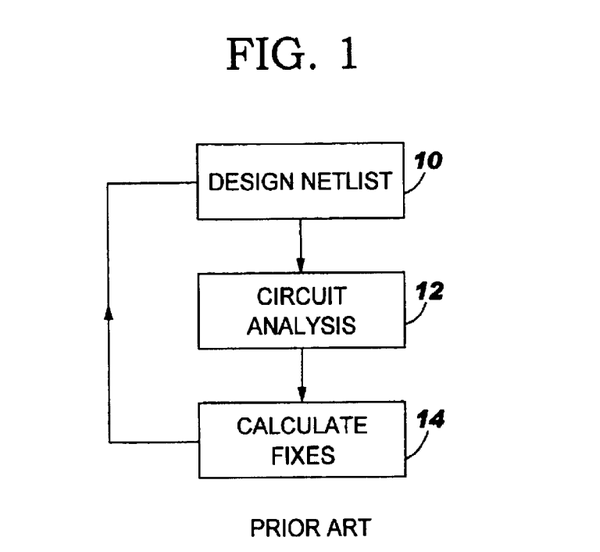
FIG. 1 is a flow diagram of outlining the general prior art method of integrated circuit design checking.

FIG. 1 is a flow diagram of outlining the general prior art method of integrated circuit design checking employed before first pass die layout is complete. The design is reduced to a design netlist 10 upon which circuit analysis 12 is performed. Design netlist 10 contained the circuit design information. The circuit analysis step 12 provides data so fixes can be calculated in step 14, and changes made to the netlist 10. The process is repetitive and much of the fix calculation is manual. As applied to timing analysis, this method uses estimated parasitics, supplied by the designer based on the designers prediction of relative placement of layout elements. Often this input is provided only for those networks where parasitics are believed to impact the critical timing.

Figure 2:
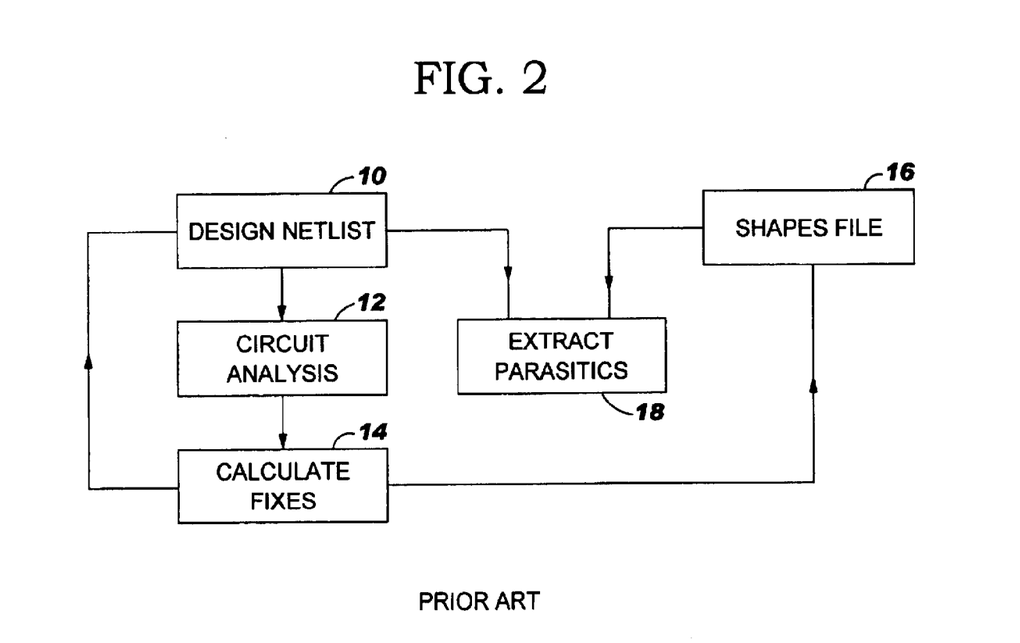
FIG. 2 is a flow diagram outlining the general prior art method of integrated circuit design checking for analyzing time delays.

FIG. 2 is a flow diagram outlining the general prior art method of integrated circuit design checking for analyzing time delays after first pass die layout is complete. The netlist 10 and a shapes file 16 are used to extract or calculate the parasitics in step 18 for each network in the design. Shapes file 16 contains the layout information. The circuit analysis software of step 12 then supplies data so the fixes can be calculated in step 14. These fixes are fed back to the design netlist 10 and the shapes file 16. While the flow of FIG. 2 has the advantage of providing more accurate delay data, it is a very time consuming. Often this process is 7 times longer than the method of illustrated in FIG. 1.

Figure 3:
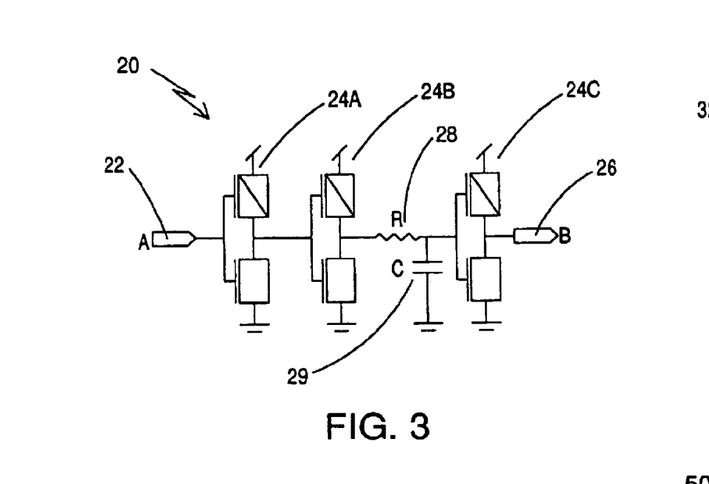
FIG. 3 is a schematic diagram of a simple network using a simple resistance/capacitance value as would be provided by a designer or estimation tool for analyzing timing delays through the network.
Figure 4:
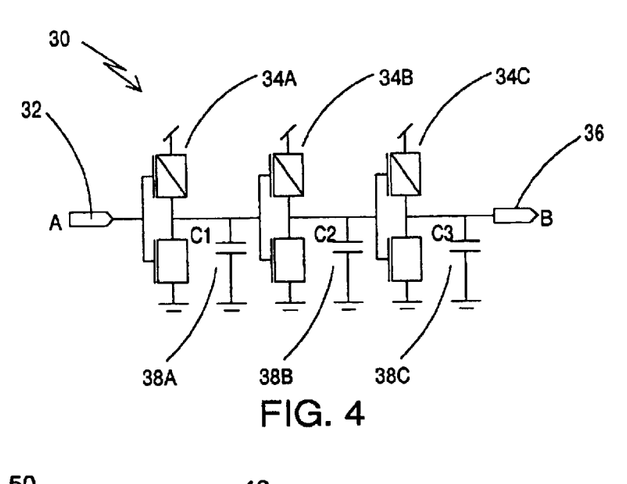
FIG. 4 is a schematic diagram of a simple network using a simple grounded capacitance parasitics model for analyzing timing delays through the network.
Figure 5:
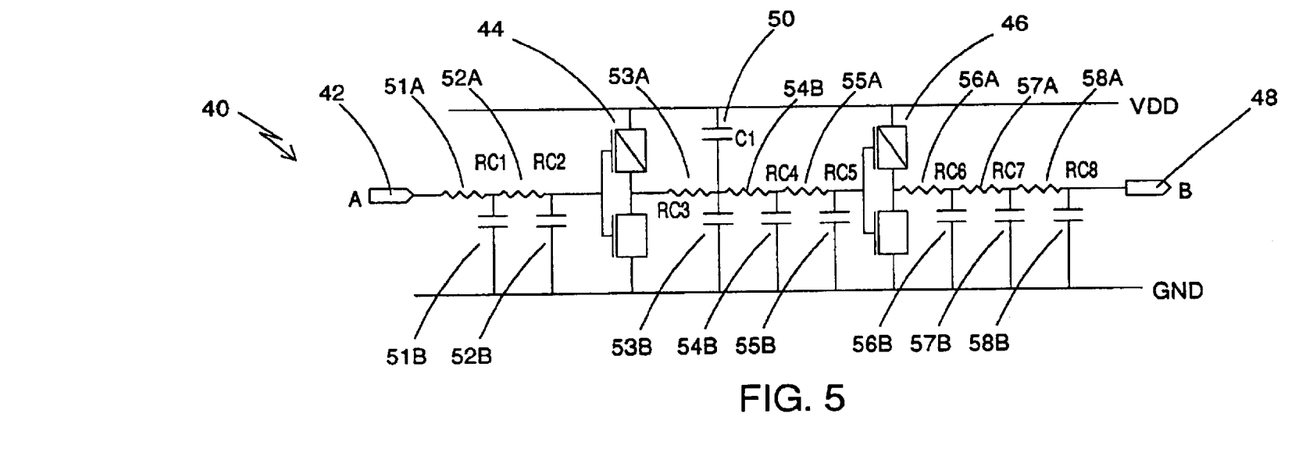
FIG. 5 is a schematic diagram of a simple network using a complex resistance and capacitance parasitics model for analyzing timing delays through the network.

To illustrate the range of modeling that can be used for parasitic extraction the examples of FIGS. 3 through 5 are instructive. FIG. 3 is a schematic diagram of a simple network using a simple resistance/capacitance value to represent anticipated parasitic elements, as might be provided by a designer or a pre-layout estimation tool for analyzing timing delays through the network. In FIG. 3 network 20 has input 22 stages 24A, 24B, and 24C, and output 26. The parasitic RC delay is modeled by the resistor 28 and capacitor 29 between stages 24B and 24C. FIG. 4 is a schematic diagram of a simple network using a simple grounded capacitance parasitic elements for analyzing timing delays through the network. In FIG. 4 network 30 has input 32 gates 34A, 34B, and 34C, and output 36. Designers can supply the parasitic as an RC delay comprised of grounded capacitors 38A, 38B and 38C combined with the output impedances of stages 34A, 34B, and 34C, respectively. FIG. 4 is illustrative of another example typical of the parasitics that might be supplied by a designer or early estimation tool for the analysis shown in FIG. 1 and described above.

Figure 6:
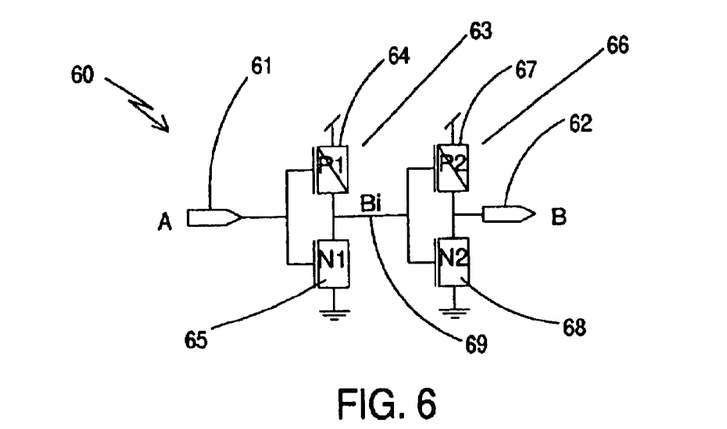
FIG. 6 is a schematic diagram of a simple network.

FIG. 5 is a schematic diagram of a simple network using a complex resistance and capacitance parasitics model for analyzing timing delays through the network; FIG. 6 is a schematic diagram of a simple network. In FIG. 5 network 40 has input 42 gates 44 and 46 and output 48. The extracted parasitics include resistor/capacitor pairs 51A/51B and 52A/52B, which introduce additional delay between input 42 and gate 44. The extracted parasitics further include resistor/capacitor pairs 53A/53B, 54A/54B, and 55A/55B between gates 44 and 46 as well has line to line capacitor 50, which also introduce additional delay. The extracted parasitics still further include resistor/capacitor pairs 56A/56B, 57A/57B, and 58A/58B, which introduce additional delay between gate 46 and output 46. This model, while supplying very accurate parasitics for delay or noise or power analysis, leads to very time consuming runs for the circuit analysis software used with this level of parasitic extraction. However simpler parasitic extractions as shown in FIGS. 3 and 4 and described above, when applied to all nets, can reduce analysis accuracy to an unacceptable degree. The alternative of using manual selection of some networks for the complex models and others for simple parasitic extraction introduces the risk of human error.

In today's environment the size of elements on semiconductor devices is decreasing, thus the number of elements in an integrated circuit design are increasing making long run times longer and more unacceptable. At the same time, new technologies, circuit design styles, and scaling mean the impact of parasitics on timing, noise, and power grids is increasing and more accurate analysis is required. Therefore there exists a need for a method to provide accurate integrated circuit timing, noise and power design checking in less time.

SUMMARY OF THE INVENTION

The present invention provides a method of selectively reducing the complexity of individual network and combined network analysis in an integrated circuit design thus reducing runtimes, while controlling the loss of accuracy of the resulting analysis. The present invention employs a circuit analysis technique suitable for performing timing delay, noise sensitivity, or power consumption analysis.

The invention provides a method of selectively reducing the complexity of the extracted netlist, and thus analysis runtimes, while controlling the loss of accuracy of the resulting analysis. A preliminary analysis is used to divide the range of possible characteristics for each net into a range in which the net definitely would not cause a constraint violation in the resulting analysis, a range in which the net definitely would cause a constraint violation in the resulting analysis, and an intermediate range in which it cannot be easily determined whether or not the net would cause a constraint violation in the subsequent analysis. Each net is then passed through a series of successively more accurate and expensive screens, and successively more accurate and expensive estimates for the net characteristics are determined, until it can be determined whether or not the net will cause a constraint violation in the subsequent analysis. The goal is to use the minimum accuracy necessary for each net. The final and most accurate estimate of net characteristics is used only for those nets which cannot be definitively classified using previous screens and characteristic estimates. The result is a much reduced data volume and complexity while maintaining overall accuracy of the analysis.

The method comprises the steps of calculating a first performance parameter by analyzing the network's sensitivity to a signal applied to the network; comparing the first performance parameter to one or more rules to determine a first pass condition and writing the value of first performance parameter to a netlist file in response to a pass to the first pass condition; followed by calculating a second performance parameter based on a first network model to determine a second pass condition in response to a fail to said first pass condition and writing the second performance parameter to the netlist file in response to a pass to said second pass condition or writing an error flag to the netlist file in response to a fail to said second pass condition. Instead of terminating the analysis after the second performance factor has been determined, additional performance parameters may be determined using increasing complicated network models and refined estimates of the sensitivity value.

The present invention has the advantage of using the minimum accuracy necessary to determine timing delays, noise sensitivity or power consumption for individual networks or each network in an integrated circuit design. The result is a reduced data volume and reduced run time in subsequent dependent analysis steps. Yet it maintains overall accuracy of the analysis.

BRIEF DESCRIPTION OF DRAWINGS

The novel features believed characteristic of the invention are set forth in the appended claims. The invention itself however, as well as a preferred mode of use, further objects and advantages thereof, will best be understood by reference to the following is a detailed description of an illustrative embodiment when read in conjunction with the accompanying drawings, wherein:

DETAILED DESCRIPTION OF THE INVENTION

Figure 7:
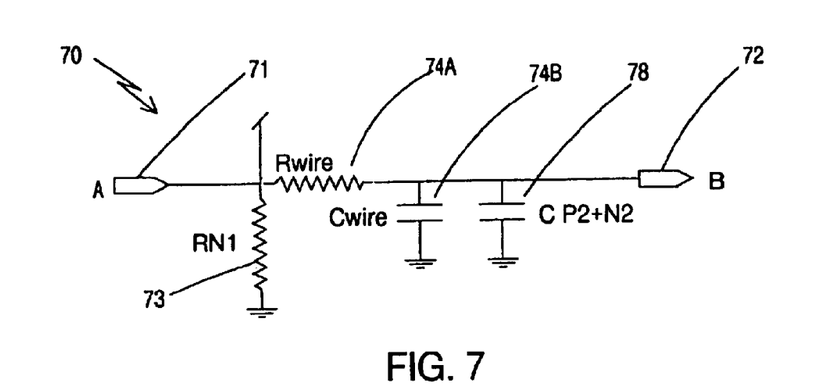
FIG. 7 is a schematic diagram of the network of FIG. 6 reduced to its delay components.
Figure 8:
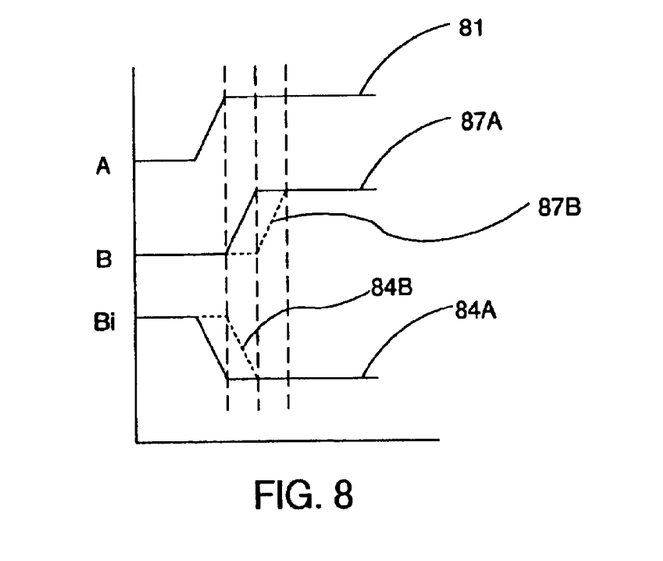
FIG. 8 is timing diagram of the network of FIG. 6.

The present invention is described primarily in terms of timing delay analysis, but the invention may be practiced for noise, power consumption, or reliability analysis as well. The description also considers only late mode constraints on delays and wire lengths, i.e., upper bounds on the delay or wire length, but the invention may equally be applied to the case of early mode constraints which impose lower bounds on the delay or wire length, or to concurrent late mode and early mode constraints. FIGS. 6 through 8 will be used to describe a method of parasitic analysis that may be used as part of the invention, though another method may be substituted. FIG. 6 is a schematic diagram of a simple network. Network 60 has input 61, a first gate 63 formed of transistor elements 64 and 65 a second gate 66 formed of transistor elements 67 and 68. Node Bi 69 connects gates 63 and 66.

FIG. 7 is a schematic diagram of the network of FIG. 6 reduced to its delay components. Representative circuit 70 has input 71 and output 72. The parasitics have been extracted to be the resistance 73 through transistor 65, the resistance/capacitance of 74A/74B of the wire length of node Bi 69, and the grounded capacitance 78 of transistors 66 and 68.

FIG. 8 is timing diagram of the network of FIG. 6. Curve 81 shows the rise of a signal on circuit input 61. Curve 84A shows the signal fall on node Bi 69 if there was no delay, while curve 84B shows the signal fall on node Bi 69 with delay. Curve 87A shows the signal rise on output 62 if there was no delay, while curve 87B shows the signal rise on node output 62 with delay.

Figure 9:
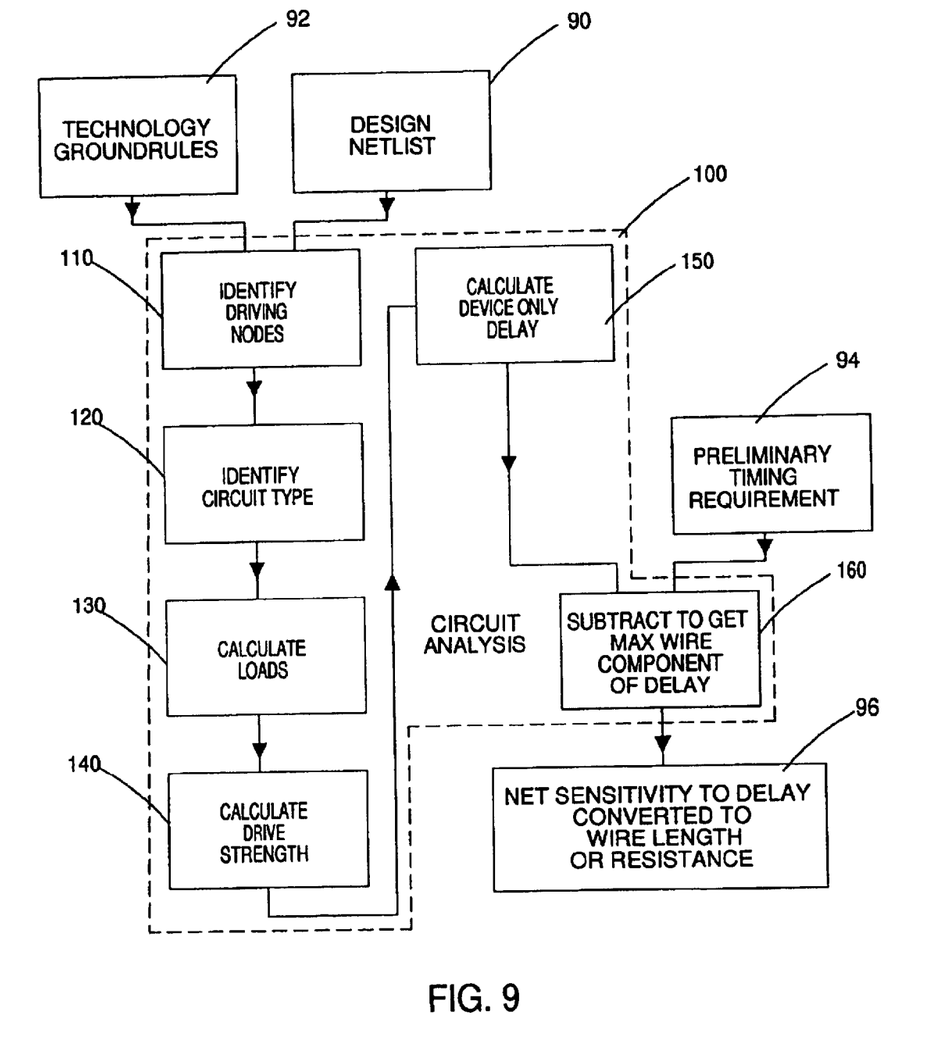
FIG. 9 is flow diagram outlining a method of circuit analysis for determining the sensitivity of a network to a net delay in a network.

FIG. 9 is flow diagram outlining a method of circuit analysis for determining delay in a network that is suitable for use by the present invention though another method may be substituted. Design netlist 90, technology ground rules 92, and preliminary timing requirements 94 are inputs to circuit analysis 100 to obtain maximum wire length 96. For the purposes of the present invention wire length and wire resistance are equivalents. The preliminary timing requirements are the maximum delays allowed on each net which will not cause a timing violation, and can be determined using a timing apportionment method such as that described by R. Nair et al., "Generation of Performance Constraints for Layout", IEEE Transactions on Computer-Aided Design, vol. 8, no. 8, pp. 860–874, August 1989. Technology ground rules 92 in combination with design data about a net from netlist 90 are used to identify the driving nodes in step 110 and the circuit type in step 120. This information is used to calculate the loads on the network in step 130. In step 140 the drive strengths are calculated. The drive strength is used to calculate the network delay due to device (transistors, etc.) only delays in step 150. This delay is subtracted from the preliminary timing requirement 94 in step 160 to obtain the amount of additional delay due to interconnect which may be tolerated on the net without causing performance problems. This additional delay margin is used to obtain the net sensitivity 96 to delay expressed as a maximum wire length or maximum wire resistance which is an input to the method of the present invention.

Figure 10:
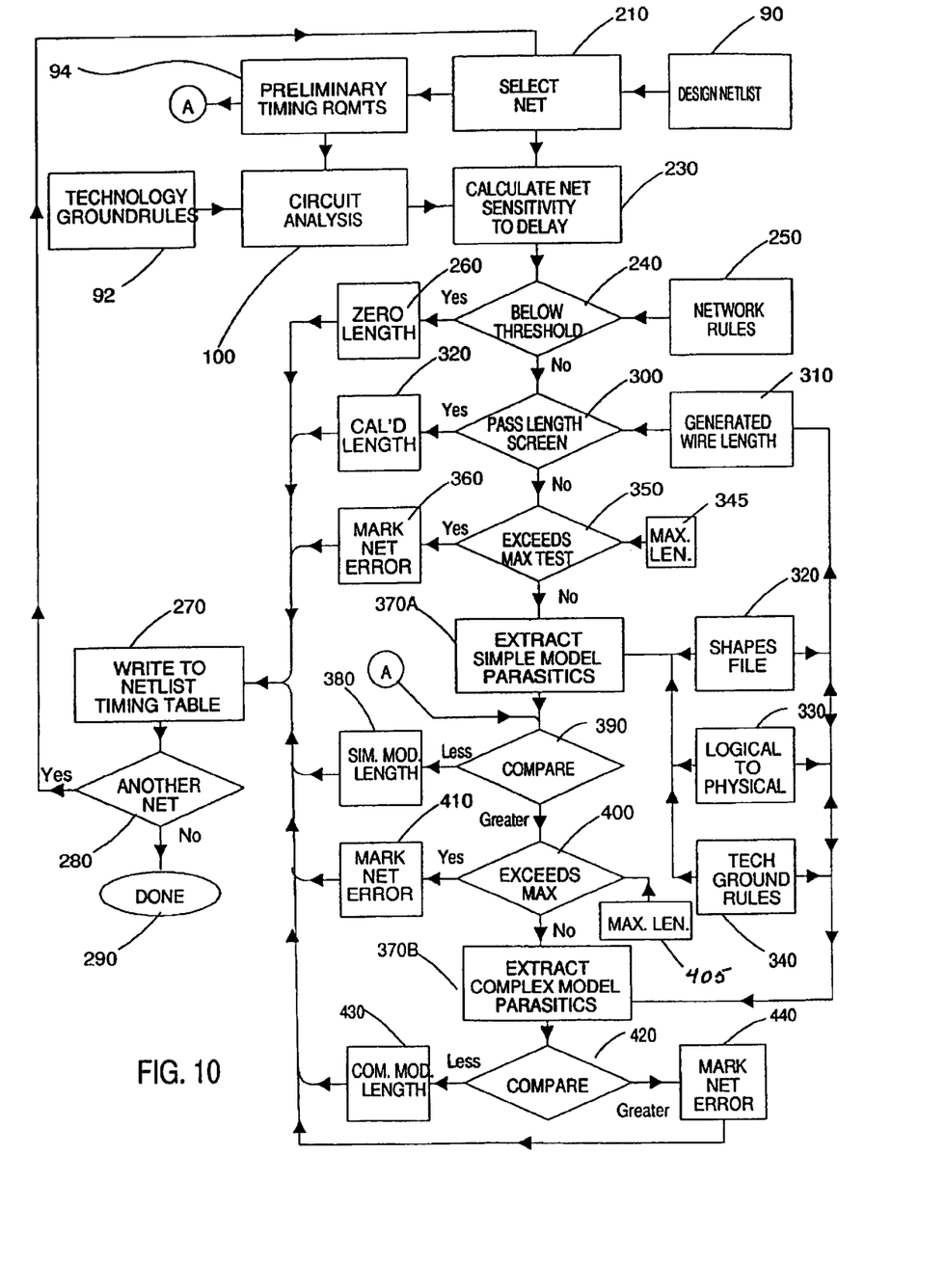
FIG. 10 is a flow diagram outlining the method of the present invention as applied to determining delays in networks in an integrated circuit design.

FIG. 10 is a flow diagram outlining the method of the present invention as applied will consider delays in networks in an integrated circuit design. For simplification, from this point onward, we will consider delays as wire lengths only, although one could equally use delays directly or use other transformations of delay. In step 210 a net is selected from netlist 90. This allows the proper preliminary timing requirement length to be selected in step 94 and this preliminary timing requirement along with the technology ground rules 92 is used in step 100 to perform circuit analysis on the selected network. The result of the circuit analysis is the net sensitivity to delay calculated in step 230 expressed as a calculated wire length 96. In step 240 calculated wire length 96 is compared to a threshold length which is an upper bound on the expected length of any net on the chip (e.g., the total corner-to-corner distance across the chip) determined using network rules 250. If calculated wire length 96 is greater than or equal to a threshold length defined by network rules 250, then we can be assured that the net will not cause a constraint violation in the subsequent analysis, and a zero delay 260 is written to the netlist timing table in step 270. One could equally write out any delay value less than the delay computed in step 160 to determine the net sensitivity, as any such value will not cause a timing constraint violation. For example, for safety one might choose to write out parasitic elements corresponding to the threshold length used in the comparison. Zero is used here because it provides the greatest reduction in the extracted netlist data and hence the greatest reduction in the runtime of the subsequent analysis. It is then determined in step 280 if another net needs to be analyzed. If yes, the invention returns to step 210, otherwise it terminates in step 290. If calculated wire length 96 is below the threshold length, then a length compare step 300 is performed. Input to length compare step 300 is calculated wire length 96 and a generated wire length 310 obtained from combining data in the shapes file 320, the logical to physical design file 330, and technology ground rules file 340. Generated length 310 is a more accurate prediction of the nominal wire length that will be physically implemented than the threshold length used in the comparison of step 240. Instead of a single length value, step 310 may generate a pair of values comprising upper and lower bounds on the wire length that will be physically implemented. Generated wire length 310 (the upper bound if two values are computed in step 310) is compared to calculated wire length 96. If calculated wire length 96 is greater than or equal to the generated wire length 340, then we can be assured that the net will not cause a constraint violation in the subsequent analysis, and calculated wire length 96 is written to the netlist timing table 270. One could equally write out any delay value less than the delay computed in step 160 to determine the net sensitivity, as any such value will not cause a timing constraint violation. For example, for more accuracy in the subsequent analysis one might choose to write out parasitic elements corresponding to the generated length used in the comparison. Note that while this may yield more accurate delays in the subsequent timing analysis, it does not improve the accuracy with which the subsequent analysis determines whether or not a timing constraint violation exists in the design. If calculated wire length 96 is below the threshold in step 300, the generated wire length 310 (the lower bound if two values are computed in step 310) is then compared to a first maximum pre-defined length 345 for that net or type of net in step 350. This maximum predefined length might, for example, be a length at which the wire load on the net causes unacceptably long signal rise or fall times. If generated wire length 310 exceeds the maximum wire length 345, then error 360 is written to the netlist-timing table 270. If generated calculated wire length 310 does not exceed the maximum wire length 345, step 370A extracts the parasitic components of the network being analyzed for analysis according to a simple parasitic model, which may be similar to that shown in FIG. 4. The output of this extraction is used to compute a simple model wire delay which is compared to preliminary timing requirement 94 in step 390. Instead of a single delay value, step 370A may generate a pair of values comprising upper and lower bounds on the wire delay that will be physically implemented. If this simple model wire delay computed in step 370A (the upper bound if two values are computed in step 370A) is less than or equal to the preliminary timing requirement 94 then we can be assured that this net will not cause a constraint violation in the subsequent analysis, and parasitics corresponding to this simple model wire delay are written to netlist timing table 270 in step 380. If the simple model wire length computed in 370A is greater than preliminary timing requirement 94, test 400 is performed. If the simple model wire delay computed in step 370A (the lower bound if two values are computed in step 370A) is greater than or equal to the delay corresponding to a second predetermined maximum wire length 405, then error 410 is written to netlist timing table 270. Note first and second maximum wire lengths 345 and 405 may be the same value.

If the simple model wire delay computed in step 370A is equal to or less than second maximum wire length 405, then step 370B is performed. Step 370B extracts the parasitic components of the network being analyzed for analysis according to a complex parasitic model, which may be similar to that shown in FIG. 5. The output of this extraction is used to compute a complex model wire delay which is compared to preliminary timing requirement 94 in step 420. If complex model wire delay computed in step 370B is less than or equal to the preliminary timing requirement 94, then parasitic elements corresponding to the complex model wire delay 430 are written to netlist timing table 270. If simple model wire delay 430 is greater than preliminary timing requirement 94, then error 440 is written to netlist timing table 270. This final comparison step 420 may be omitted, proceeding instead directly to step 430 to write parasitics corresponding to the delay computed in step 370B to the netlist timing table, and allowing the subsequent analysis to determine whether a violation exists.

The present invention has been described as writing all extracted net parasitics to a netlist timing table, but the invention could also be used to annotate an in-memory data model, or to respond to a request from a user or another software application for characteristic information about a particular net. The invention is also described as performing successive screens and value refinements on a single net before continuing on to another net, but it could be also operate on all nets in parallel by performing comparison 240 on all nets before continuing to perform comparison 300 on all nets, and so on. When practiced in this manner the improved estimates of the all net characteristics available after each comparison could be used to derive new timing requirements which more accurately reflect the expected relative magnitudes of the delays on various network paths, to replace preliminary timing requirements 94 in subsequent steps.

The present invention has hereto been described for the case where the parameter to be checked is delay expressed in time, the rules are timing rules, and the model is a network timing model. The invention may also be applied to the case where the parameter to be checked is a voltage level, the rules are noise sensitivity rules, and the model is a network noise model. Equally, the invention may be applied to the case where the parameter to be checked is a current level, the rules are noise power consumption rules, and the model is a network power consumption model. The invention may also be applied to the case where the parameter to be checked is the local temperature of a circuit element, the rules are thermal and reliability rules, and the parasitic elements are thermal resistances and capacitances.

Figure 11:
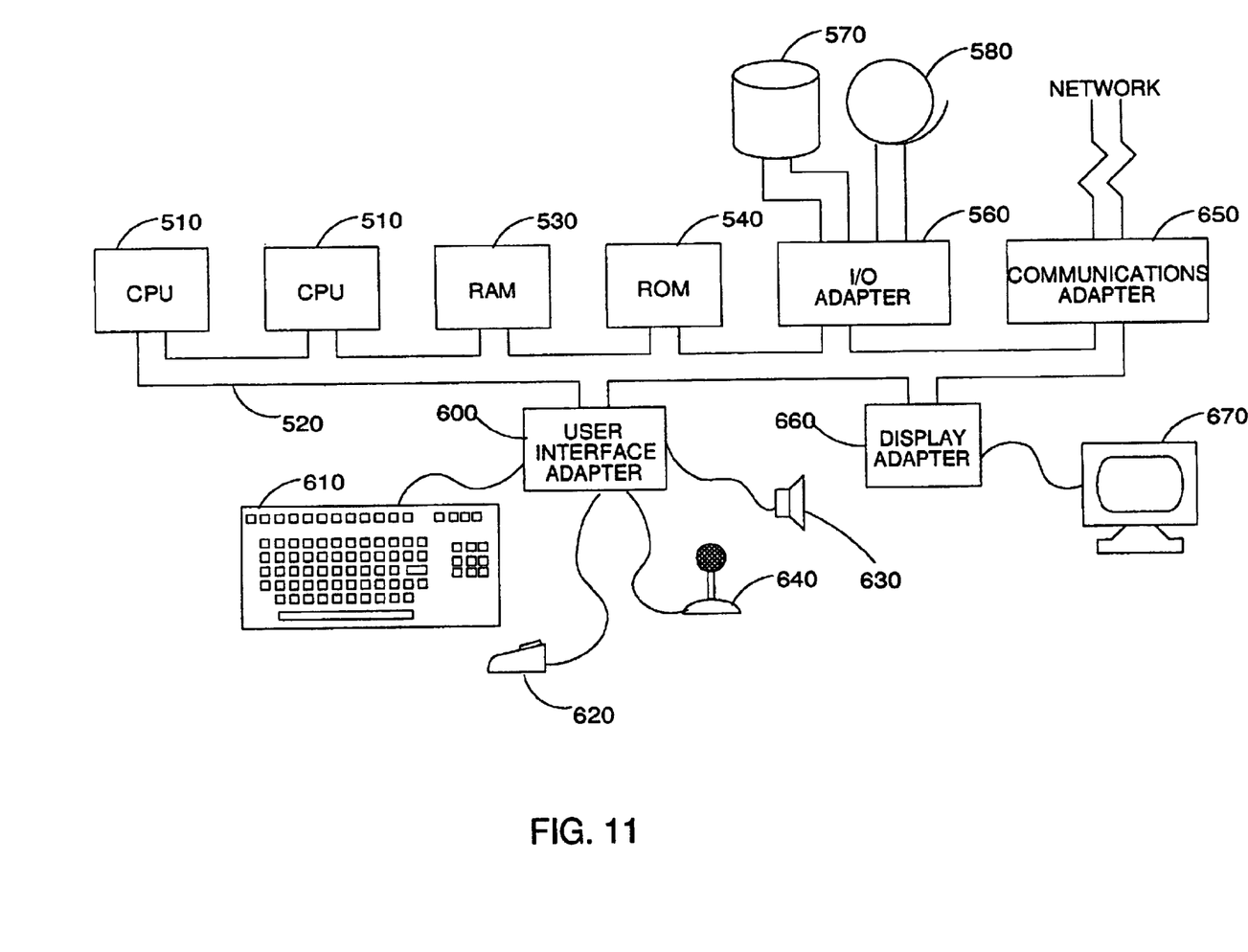
FIG. 11 is a diagram illustrating a typical hardware configuration of a computer system capable of checking an integrated circuit network design in accordance with the subject invention.

A representative hardware environment for practicing the present invention is depicted in FIG. 11, which illustrates the typical hardware configuration of a computer system capable of checking an integrated circuit network design in accordance with the present invention having at least one processor or central processing unit (CPU) 510.

CPUs 510 are interconnected via system bus 520 to a random access memory (RAM) 530, read-only memory (ROM) 540, an input/output (I/O) adapter 560 for connecting peripheral devices such as disk units 570 and tape drives 580 to bus 520, user interface adapter 600 for connecting keyboard 610, mouse 620, speaker 630, microphone 640, and/or other user interface devices such as touch screen device (not shown) to bus 520, communication adapter 650 for connecting the information handling system to a data processing network, and display adapter 660 for connecting bus 520 to display device 670. The design netlist 90, technology groundrules 92, and preliminary timing requirement 94 shown on FIG. 9 and netlist 90, technology groundrules 92, preliminary timing requirement 94, and maximum length or maximum wire resistance 345 shown on FIG. 10 can be loaded on the appropriate disk or tape units or fed either through I/O adapters or the network for processing. A computer program with an appropriate application interface could be created by one of skill in the art and stored on the system to simplify the practicing of this invention.

The description of the embodiments of the present invention is given above for the understanding of the present invention. It will be understood that the invention is not to the particular embodiments described herein, but is capable of various modifications, rearrangements and substitutions will now become apparent to those skilled in the art without departing from the scope of the invention. Therefore it is intended that the following claims cover all such modifications and changes as fall within the true spirit and scope of the invention.

What is claimed is:

1. A method of checking an integrated circuit network design comprising the steps of:

calculating a first performance parameter by analyzing said networks sensitivity to a signal applied to said network;

comparing said first performance parameter to at least one rule to determine a first pass condition and writing said first performance parameter to a netlist file in response to a pass to said first pass condition; and calculating a second performance parameter based on a first network model to determine a second pass condition in response to a fail to said first pass condition and writing said second performance parameter to said netlist file in response to a pass to said second pass condition and writing an error flag to said netlist file in response to a fail to said second pass condition.

2. The method of claim 1, wherein said performance parameters are delays expressed in time, wire length or wire resistance, said rule is a timing rule, and said first network model is a network timing model.

3. The method of claim 1, wherein said performance parameters are voltage levels, said rule is a noise sensitivity rule and said first network model is a network noise sensitivity model.

4. The method of claim 1, wherein said performance parameters are current levels, said rule is a power consumption rule and said first network model is a network power consumption model.

5. A method of checking a integrated circuit network design comprising the steps of:

(a) providing a set of network models of increasing complexity;

(b) selecting the least complex network model from said set of models;

(c) applying a signal to said network based on said selected model to determine a performance parameter;

(d) comparing said performance parameter to a pass rule to determine a pass condition;

(e) in response to a pass to said pass condition writing said performance parameter to a netlist file and terminating said checking of said design;

(f) in response to fail condition selecting the next higher complexity model selected and repeating steps (b) through (e); and (g) writing an error flag to said netlist file.

6. The method of claim 5, wherein said performance parameters are delays expressed in time, wire length or wire resistance, said pass rule is a timing rule, and said set of network models is comprised of timing models.

7. The method of claim 5, wherein said performance parameters are voltage levels, said pass rule is a noise sensitivity rule, and said set of network models is comprised of noise sensitivity models.

8. The method of claim 5, wherein said performance parameters are current levels said pass rule is a power consumption rule and said set of network models is comprised of power consumption models.

9. A method of checking a integrated circuit design comprised of a set of networks comprising the steps of:
   (a) selecting and analyzing each network in turn by the steps of,
      (i) calculating a first performance parameter by analyzing said selected networks sensitivity to a signal applied to said selected network;
      (ii) comparing said first performance parameter to at least one rule to determine a first pass condition and writing said first performance parameter to a netlist file in response to a pass to said first pass condition; and
      (iii) calculating a second performance parameter based on a first network model applied to said selected network to determine a second pass condition in response to a failure to said first pass condition and writing said second performance parameter to said netlist file in response to a pass to said second pass condition and writing an error flag to said netlist file in response to a fail to said second pass condition; and
   (b) repeating steps (i) through (iii) until all said networks have been selected and analyzed.

10. The method of claim 9, wherein said performance parameters are delays expressed in time, wire length or wire resistance, said pass rule is a timing rule, and said set of network models is comprised of timing models.

11. The method of claim 9, wherein said performance parameters are voltage levels, said pass rule is a noise sensitivity rule, and said set of network models is comprised of noise sensitivity models.

12. The method of claim 9, wherein said performance parameters are current levels, said pass rule is a power consumption rule, and said set of network models is comprised of power consumption models.

13. A method of checking a integrated circuit design comprised of a set of networks comprising the steps of
   (a) selecting and analyzing each network in turn by the steps of,
      (i) providing a set of network models of increasing complexity;
      (ii) selecting the least complex network model from said set of models;
      (iii) applying a signal to said selected network based on said selected model to determine a performance parameter;
      (iv) comparing said performance parameter to a pass rule to determine a pass condition;
      (v) in response to a pass to said pass condition writing said performance parameter to a netlist file and terminating said checking of said design;
      (vi) in response to fail condition selecting the next higher complexity mode selected and repeating steps (iii) through (v) until all models have then selected; and
      (vii) writing an error flag to said netlist file; and
   (b) repeating steps (iii) through (vii) until all said networks have been selected and analyzed.

14. The method of claim 13, wherein said performance parameters are delays expressed in time, wire length or wire resistance, said pass rule is a timing rule, and said set of network models is comprised of timing models.

15. The method of claim 13, wherein said performance parameters are voltage levels, said pass rule is a noise sensitivity rule, and said set of network models is comprised of noise sensitivity models.

16. The method of claim 13, wherein said performance parameters are current levels, said pass rule is a power consumption rule, and said set of network models is comprised of power consumption models.

17. A method of timing analysis for an integrated circuit design comprised of a set of networks comprising the steps of:
   (a) selecting and analyzing each network in turn by the steps of:
      (i) calculating a first network delay by subtracting said device only delays of said selected network from a preliminary timing requirement of said selected network;
      (ii) comparing said first delay to at least one network delay rule to determine if said delay is below a threshold limit and said first delay being below said threshold limit, writing a zero delay to a netlist file and terminating analysis of said selected network;
      (iii) in response to said first delay being above said threshold limit but below a screen limit, writing said first delay to said netlist file and terminating analysis of said selected network;
      (iv) in response to said first delay being above said screen limit, determining if said first delay is above a maximum limit and if said first delay is above said maximum limit, writing an error flag to said netlist file and terminating analysis of said selected network;
      (v) in response to said first delay being below said maximum limit, performing a network parasitic element extraction using a first delay model and calculating a second network delay;
      (vi) comparing said second delay to said preliminary timing requirement to determine a pass condition and in response to a pass to said pass condition, writing said second delay to said netlist file and terminating analysis of said selected network;
      (vii) in response to a fail to said pass condition, determining if said second delay is above said maximum limit and if said second delay is above said maximum limit writing an error flag to said netlist file and terminating analysis of said selected network;
      (viii) in response to said second delay being below said maximum limit, performing a network parasitic element extraction using a second delay model and calculating a third network delay; and
      (ix) comparing said third delay to said maximum limit and if said second delay is below said maximum limit writing said third delay to said netlist file otherwise writing an error flag to said netlist file and terminating analysis of said selected network; and
   (b) repeating steps (i) through (ix) until all said networks have been selected and analyzed.

18. The method of claim 17 wherein said first delay model is less complex than said second delay model.

19. The method of claim 18 wherein said delays are calculated and expressed as wire lengths.

20. The method of claim 18 wherein said delays are calculated and expressed as wire resistance's.

21. The method of claim 18 wherein said parasitics' of said first model are grounded capacitance's and said parasitics of said second model are capacitance/resistance networks.

22. A program storage device readable by machine, tangibly embodying a program of instructions executable by the machine to perform method steps for checking an integrated network circuit design comprising the steps of:
   calculating a first performance parameter by analyzing said networks sensitivity to a signal applied to said network;

comparing said first performance parameter to at least one rule to determine a first pass condition and writing said first performance parameter to a netlist file in response to a pass to said first pass condition; and calculating a second performance parameter based on a first network model to determine a second pass condition in response to a fail to said first pass condition and writing said second performance parameter to said netlist file in response to a pass to said second pass condition and writing an error flag to said netlist file in response to a fail to said second pass condition.

23. The method of claim 22, wherein said performance parameters are delays expressed in time, wire length or wire resistance, said rule is a tinting rule, and said first network model is a network timing model.

24. The method of claim 22, wherein said performance parameters are voltage levels, said rule is a noise sensitivity rule and said first network model is a network noise sensitivity model.

25. The method of claim 22, wherein said performance parameters are current levels, said rule is a power consumption rule and said first network model is a network power consumption model.

26. A computerized design system which checks an integrated circuit network design which comprises:

means for calculating a first performance parameter by analyzing said networks sensitivity to a signal applied to said network;

means for comparing said first performance parameter to at least one rule to determine a first pass condition and writing said first performance parameter to a netlist file in response to a pass to said first pass condition; and means for calculating a second performance parameter based on a first network model to determine a second pass condition in response to a fail to said first pass condition and writing said second performance parameter to said netlist file in response to a pass to said second pass condition and writing an error flag to said netlist file in response to a fail to said second pass condition.

27. The method of claim 26, wherein said performance parameters are delays expressed in time, wire length or wire resistance, said rule is a tinting rule, and said first network model is a network timing model.

28. The method of claim 26, wherein said performance parameters are voltage levels, said rule is a noise sensitivity rule and said first network model is a network noise sensitivity model.

29. The method of claim 26, wherein said performance parameters are current levels, said rule is a power consumption rule and said first network model is a network power consumption model.

* * * * *